US010075839B2

(12) United States Patent
Zhang (10) Patent No.: US 10,075,839 B2
(45) Date of Patent: Sep. 11, 2018

(54) INFORMATION PROCESSING METHOD AND ELECTRONIC DEVICE

(71) Applicant: Lenovo (Beijing) Co., Ltd., Beijing (CN)

(72) Inventor: Caijiao Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/458,355

(22) Filed: Mar. 14, 2017

(65) Prior Publication Data

US 2018/0007531 A1   Jan. 4, 2018

(30) Foreign Application Priority Data

Jun. 29, 2016   (CN) .......................... 2016 1 0500493

(51) Int. Cl.
| | | |
|---|---|---|
| *H04W 8/02* | (2009.01) | |
| *H04W 8/18* | (2009.01) | |
| *H04M 1/725* | (2006.01) | |
| *H04W 8/12* | (2009.01) | |
| *H04W 8/04* | (2009.01) | |
| *H04W 8/24* | (2009.01) | |

(52) U.S. Cl.
CPC ............ *H04W 8/02* (2013.01); *H04W 8/183* (2013.01); *H04M 1/72519* (2013.01); *H04W 8/04* (2013.01); *H04W 8/12* (2013.01); *H04W 8/245* (2013.01)

(58) Field of Classification Search
CPC ....... H04W 8/183; H04W 8/245; H04W 8/12; H04W 80/04; H04W 60/005; H04W 8/04; H04W 8/02; H04M 1/72519; H04M 1/72525; H04L 5/0048
USPC ............ 455/432.1, 418, 550.1, 433; 370/328
See application file for complete search history.

(56) References Cited

U.S. PATENT DOCUMENTS

| | | | | |
|---|---|---|---|---|
| 9,215,683 | B1 * | 12/2015 | Tonogai | H04W 60/005 |
| 2015/0043377 | A1 * | 2/2015 | Cholas | H04W 48/08 |
| | | | | 370/254 |
| 2016/0055556 | A1 * | 2/2016 | Ignatius | G06Q 30/0609 |
| | | | | 705/26.35 |
| 2016/0057725 | A1 * | 2/2016 | Suh | G06Q 50/30 |
| | | | | 455/435.1 |
| 2016/0212670 | A1 * | 7/2016 | Eriksson | H04L 5/0048 |
| 2016/0352816 | A1 * | 12/2016 | Xiao | H04L 67/00 |

(Continued)

*Primary Examiner* — Danh C Le
(74) *Attorney, Agent, or Firm* — Anova Law Group, PLLC (57) ABSTRACT

An information processing method is provided for a mobile terminal. The method includes obtaining a first identity identifier assigned to a terminal by a network side; in response to loading the first identity identifier and, from a plurality of identity identifiers of the terminal, determining a second identity identifier as an identity identifier of the terminal in a first operation state; obtaining, based on the second identity identifier, information used for registering and connecting with a second communication network; establishing a data connection between the first identity identifier and the first communication network; and on the data connection established between the first identity identifier and the first communication network, registering with the second communication network using the information for registering and connecting with the second communication network.

12 Claims, 6 Drawing Sheets

(56) References Cited

U.S. PATENT DOCUMENTS

| | | | |
|---|---|---|---|
| 2017/0071021 A1* | 3/2017 | Jin | H04W 76/025 |
| 2017/0118210 A1* | 4/2017 | Athias | H04L 63/0876 |
| 2017/0164221 A1* | 6/2017 | Tan Bergstrom | H04W 24/04 |
| 2017/0195190 A1* | 7/2017 | Bugenhagen | H04L 41/22 |

* cited by examiner

INFORMATION PROCESSING METHOD AND ELECTRONIC DEVICE

CROSS-REFERENCES TO RELATED APPLICATIONS

This application claims priority of Chinese Patent Application No. 201610500493.4, filed on Jun. 29, 2016, the entire contents of which are hereby incorporated by reference.

FIELD OF THE INVENTION

The present disclosure generally relates to the field of information processing technology and, more particularly, relates to an information processing method and an electron device thereof.

BACKGROUND

With the development of smart terminal and wireless network technologies, users expect to case a same terminal to access the Internet in different locations. Because different locations may be covered by different communication networks, the users may be required to pay expensive roaming data service charge for data transmission, particularly in the case of international roaming.

In order to save the tariff, it is desired to localize the service charge when the user is in international roaming. To do this, card information for multiple roaming countries is stored in the cloud. When a terminal is in roaming, the card information corresponding to the roaming country is retrieved from the cloud to complete the data service localization. However, when loading the card information of the roaming country, if a physical card is inserted in the terminal, the physical card can be disabled when the card information of the roaming country is loaded, resulting in the physical card being completely unusable.

The disclosed processor and information processing, method thereof are directed to solve one or more problems set forth above and other problems.

BRIEF SUMMARY OF DISCLOSURE

A first aspect of the present disclosure is an information processing method. The method includes obtaining a first identity identifier assigned to a terminal by a network side; in response to loading the first identity identifier and, from a plurality of identity identifiers of the terminal, determining a second identity identifier as an identity identifier of the terminal in a first operation state; obtaining, based on the second identity identifier, information used for registering and connecting with a second communication network; establishing a data connection between the first identity identifier and the first communication network; and on the data connection established between the first identity identifier and the first communication network, registering with the second communication network using the information for registering and connecting with the second communication network.

A second aspect of the present disclosure is an electronic device. The electronic device includes a processor supported by the device, and a communication module communicating with the processor. The processor obtains a first identity identifier assigned to a terminal by a network side; in response to loading the first identity identifier on the terminal and, from a plurality of identity identifiers of the terminal, determines a second identity identifier as an identity identifier of the terminal in a first operation state; and obtains, based on the second identity identifier, information used for registering and connecting with a second communication network. Further, the communication module establishes a data connection between the first identity identifier and the first communication network; and, on the data connection established between the first identity identifier and the first communication network, registers with the second communication network using the information for registering and connecting with the second communication network.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to example embodiments of the invention, which are illustrated in the accompanying drawings. Wherever possible, the same reference numbers may be used throughout the drawings to refer to the same or like parts. The described embodiments are some, but not all, of the embodiments of the present invention. Based on the disclosed embodiments and without inventive efforts, persons of ordinary skill in the art may derive other embodiments consistent with the present disclosure, all of which are within the scope of the present invention.

The present disclosure provides an information processing method and an electronic device thereof. The electronic device consistent with the disclosed embodiments may include a variety of mobile terminals, such as a mobile phone, a tablet computer, or a notebook computer, or any portable, pocket-sized, handheld, computer built-in, or vehicle mounted mobile device. The electronic device may perform a voice and/or data exchange over a wireless access network from various communication networks. Typically, the communication network may be a Global System for Mobile Communication (GSM) network, a Code Division Multiple Access (CDMA) network, a Wideband Code Division Multiple Access (WCDMA) Network, a Long Term Evolution (LTE) communication network, and the Like. Different types of communication networks may be operated by different operators. Other types of communication network may also be included.

Figure 1:
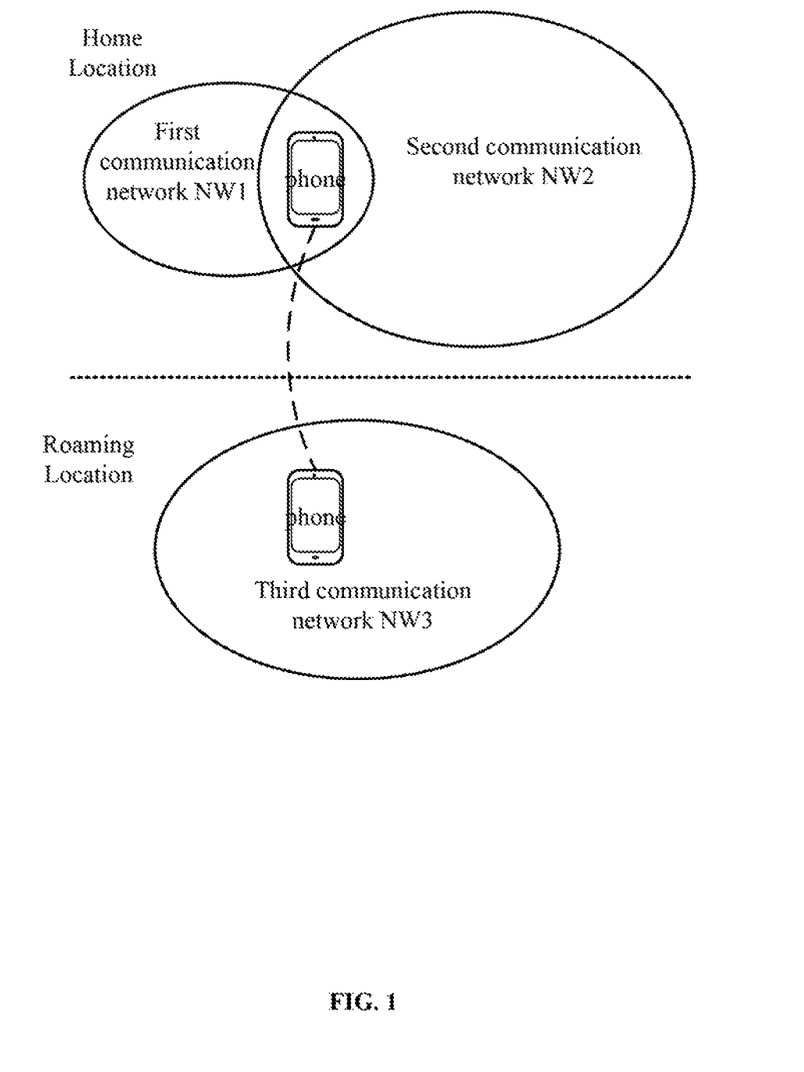
FIG. 1 illustrates an example of an operating environment consistent with the disclosed embodiments.

FIG. 1 illustrates an operating environment consistent with the disclosed embodiments. As shown in FIG. 1, a mobile phone is used as an example of an electronic device for descriptive purposes. A user of the mobile phone normally resides in a home location, but may travel to a roaming location or visitor location due to job requirement, travel, or the like.

In the home location, the user may have two subscriber identification cards, such as a first subscriber identification module (SIM) card and a second SIM card. The SIM card is merely used as an example, and the user identification card may be a user identification module (UIM) card or any appropriate subscriber identification card. The type of the subscriber identification card may vary depending on the type of communication network.

The mobile phone communicates with the first communication network NM1 through the first SIM card and communicates with the second communication network NM2 through the second SIM card. Each communication network may refer to a communication network corresponding to each subscriber identification card. Accordingly, the first communication network NM1 and the second communication network NM2 are normally different from each other and are operated by different operators, respectively. For example, the first SIM card may belong to a GSM network operated by Chinese Mobile, while the second SIM card may belong to a WCDMA network operated by China Unicom. Of course, the two SIM cards may also be two telephone numbers under a same communication network, in which case the first communication network NM1 and the second communication network NM2 both are, for example, GSM networks.

When the mobile phone user leaves the home location and travels to the roaming location, the mobile phone is in a roaming state and uses the roaming communication networks. Using international roaming as an example, the mobile phone user in the international roaming state uses the communication network of a foreign operator, i.e., a third communication network NM3, and the international roaming tariff is determined based on the agreement between the operators in the two countries or regions. The international roaming data service charge of most countries or regions are higher than the domestic data services charges. In order to save the service charges, a mobile phone user often needs to obtain, from the network side, a virtual card assigned to the mobile phone, achieving service charge localization.

Figure 2:
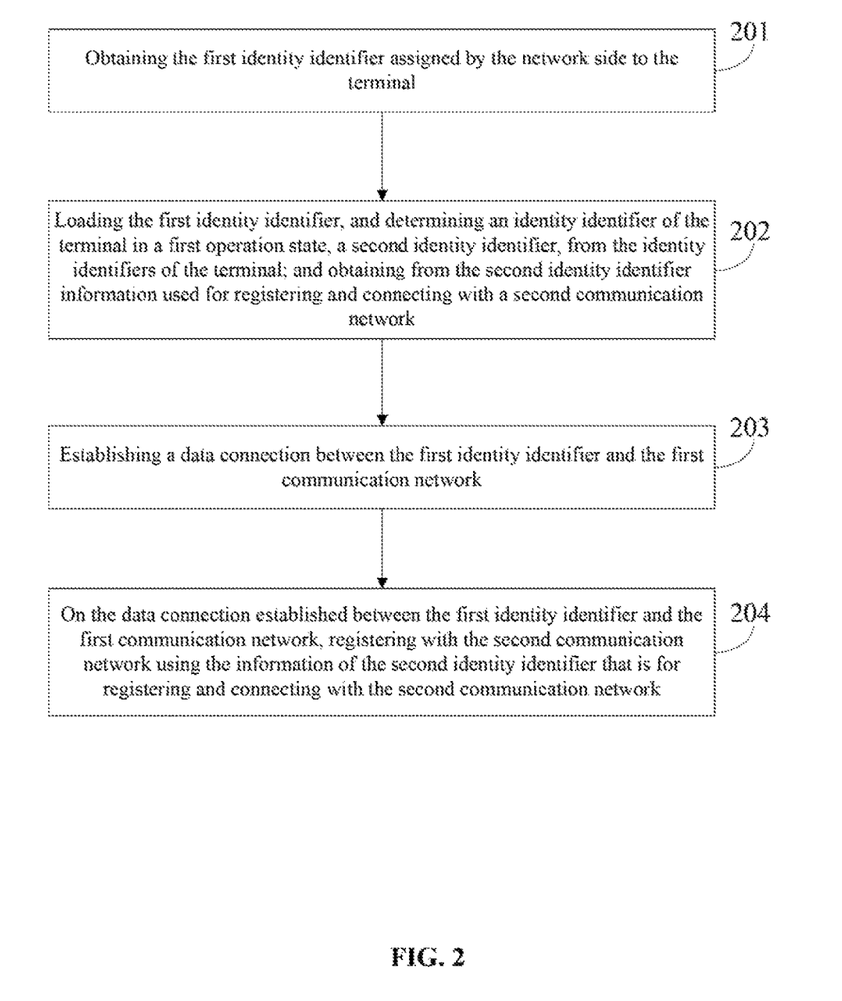
FIG. 2 illustrates a flow chart of an example of an information processing method consistent with the disclosed embodiments.

FIG. 2 illustrates a flowchart of an example of an information processing method according to the disclosed embodiments. The information processing method may be performed by the electronic device, which may also be referred as a terminal in a communication network when the electronic device communicates with the communication network, and the information processing method may include the following steps.

Step 201: Obtaining the first identity identifier assigned by the network side to the terminal.

In certain embodiments, the electronic device may include more than one communication modules. For example, the electronic device may include two communication modules, such as a first communication module and a second communication module. The first communication module may be realized by a first modem (modem1), and the second communication module may be realized by a second modem (modem2). The electronic device may also have a card slot in which a communication card cart be inserted. As used herein, the communication card may be referred as a user identification module of the user, and the communication card may be a physical card of any appropriate type, such as a SIM card, a UIM card, or the like. The electronic devices may have two or more slots and, thus, two or more internal communication cards.

In certain embodiments, the network side stores card information of a plurality of virtual cards of the respective countries and regions, which include key information other than the Ki information. When the electronic device is in a roaming state, the electronic device sends the fretwork side an allocation request for an identity identifier (i.e., a virtual card). Upon receiving the allocation request, the network side searches for the card information of a virtual card (i.e., a first identity identifier) of the country or region where the electronic device is located, and then transmits the card information of the virtual card to the electronic device.

Step 202: Loading the first identity identifier, and determining an identity identifier of the terminal in a first operation state, as a second identity identifier, from the identity identifiers of the terminal; and obtaining from the second identity identifier information used for registering and connecting with a second communication network.

Specifically, in certain embodiments, when the first identity identifier (i.e., the virtual card) is loaded, the identity identifier in the first operation state is determined as the second identity identifier from the identity identifiers of the terminal, and the information used for registering and connecting with a second communication network is obtained from the second identity identifier. When the second identity identifier is in a first operation state, the second identity identifier is disconnected from or disassociated with a modem module corresponding to the second identity identifier. At this time, the second identity identifier cannot continue normal communication with the corresponding modem module. That is, the second identity identifier is unloaded and is in a disabled state under the first operation state, which is changed from an enabled state (i.e., a second operation state) under which the second identity identifier is associated with the modem module.

As used herein, the identity identifier of the terminal refers to the physical card inserted in the card slot of the terminal, and the type of the physical card may be any appropriate type, such as a SIM card, a UIM card, or the like. The physical card stores key information about the card, such as a phone number, short message service (SMS) text, SIM password, SIM card number, and Ki information, etc. Such key information can be used to register with the network side. The physical card also include the IP Multimedia Services Identity Module (ISIM) information, and the ISIM information is also read out and stored in the terminal.

Step 203: Establishing a data connection between the first identity identifier and the first communication network.

In certain embodiments, establishing the data connection between the first identity identifier and the first communication network may refer to establishing a data connection between the virtual card and the data domain (PS domain). That is, a data connection is established between the terminal associated with the virtual card with the network using the card information of the virtual card. The virtual card may be used for data service and, to keep a high-grade service, the data service is required to register with a long term evolution (LTE) network.

Accordingly, after the physical card (the second identity identifier) is disabled in the first operation, the first identity identifier is connected to or associated with the communication module corresponding to the disabled physical card. Further, after the first identity identifier is connected to the communication module corresponding to the disabled physical card, the key information corresponding to the first identity identifier can be used to establish the data connection between first identity identifier and the first communication network.

Step 204: On the data connection established between the first identity identifier and the first communication network, registering with the second communication network using the information of the second identity identifier that is used for registering and connecting with the second communication network.

Specifically, in certain embodiments, in the PS domain of the LIE network connected with the virtual card, the key information of the disabled physical card is used to register with the IP multimedia subsystem (IMS), thereby ensuring that the physical card can also be found via the volte (Voice over Long-Term Evolution) communication. The terminal may use the ISIM information to perform the IMS registration such that the disabled physical card can be discoverable through the volte communication. That is, the IMS registration based on the ISIM information may be used to enable the second identity identifier (disabled physical card) to be discoverable through volte. In other words, the terminal associated with the second identity identifier can be discovered by registering with the IMS of the roaming LET network.

Figure 3:
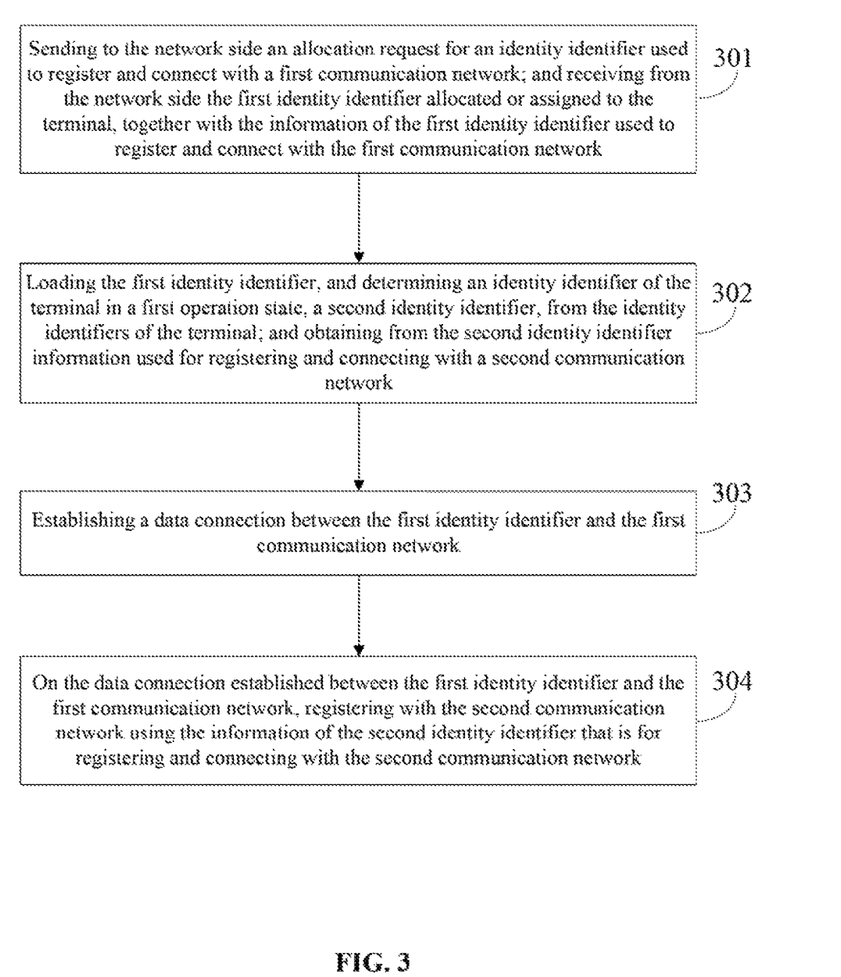
FIG. 3 illustrates a flow chart of another example of an information processing method consistent with the disclosed embodiments.

FIG. 3 illustrates a flowchart of another information processing method according to the disclosed embodiments. The information processing method may be performed by the electronic device, and the information processing method may include the following steps.

Step 301: Sending to the network side an allocation request for an identity identifier used to register and connect with a first communication network; and receiving from the network side the first identity identifier allocated or assigned to the terminal by the network side, together with the information of the first identity identifier used to register and connect with the first communication network.

In certain embodiments, the electronic device may include more than one communication modules. For example, the electronic device may include two communication modules, a first communication module and a second communication module. The first communication module may be realized by a first modem (modem1), and the second communication module may be realized by a second modem (modem2). The electronic device may also have a card slot in which a communication card can be inserted. As used herein, the communication card may be referred as a user identification module of the user, and the communication card may be a physical card of any appropriate type, such as a SIM card, a UIM card, or the like. The electronic devices may have two or more slots and, thus, two internal communication cards.

In certain embodiments, the network side stores card information of a plurality of virtual cards of the respective countries and regions, which include key information other than the Ki information. When the electronic device roams, the electronic device sends the network side an allocation request for an identity identifier (i.e., a virtual card). Upon receiving the allocation request, the network side searches for the card information of a virtual card (i.e., a first identity identifier) of the country or region where the electronic device is located, and then transmits the card information of the virtual card to the electronic device.

The first communication network refers to a 4G network, such as an LIE network. The first identity identifier assigned by the network side to the terminal refers to the virtual card assigned to the terminal by the network side. Correspondingly, the information of the first identity identifier for registering and connecting with the first communication network refers to the key information of the corresponding virtual card, such as the telephone number, the SMS text, the SIM card password, and the SIM card number, etc.

Step 302: Loading the first identity identifier, and determining an identity identifier of the terminal in first operation state, a second identity identifier, from the identity identifiers of the terminal; and obtaining from the second identity identifier information used for registering and connecting with a second communication network.

Specifically, in certain embodiments, when the first identity identifier (i.e., the virtual card) is loaded, the identity identifier in the first operation state is determined as the second identity identifier, from the identity identifiers of the terminal, and the information used for registering and connecting with a second communication network is obtained from the second identity identifier.

As used herein, the identity identifier of the terminal refers to the physical card inserted in the card slot of the terminal, and the type of the physical card may be any appropriate type, such as a SIM card, a UIM card, or the like. The physical card stores key information about the card, such as a phone number, SMS text, SIM password, SIM card number, and Ki information, etc. Such key information can be used to register with the network side. The disabled physical card also include the IP Multimedia Services Identity Module (ISIM) information, and the ISIM information is also read out and stored in the terminal.

In certain embodiments, the identity identifier in the first operation state is the physical card that is disabled when the first identity identifier is loaded.

Step 303: Establishing a data connection between the first identity identifier and the first communication network.

In certain embodiments, establishing the data connection between the first identity identifier and the first communication network may refer to establishing a data connection between the virtual card and the data domain (PS domain). The virtual card may be used for data service and, to keep a high-grade service, the data service is required to register with an LTE network.

Accordingly, after the first identity identifier is connected to the communication module corresponding to the disabled physical card, the key information corresponding to the first identity identifier can be used to establish the data connection between first identity identifier and the first communication network.

Step 304: On the data connection established between the first identity identifier and the first communication network, registering with the second communication network using the information of the second identity identifier that is for registering and connecting with the second communication network.

Specifically, in certain embodiments, in the PS domain of the LIE network connected with the virtual card, the key information of the disabled physical card is used to register with the IP multimedia subsystem, thereby ensuring that the physical card can also be found through the volte. The terminal may use the ISIM information to perform the IMS registration.

Figure 4:
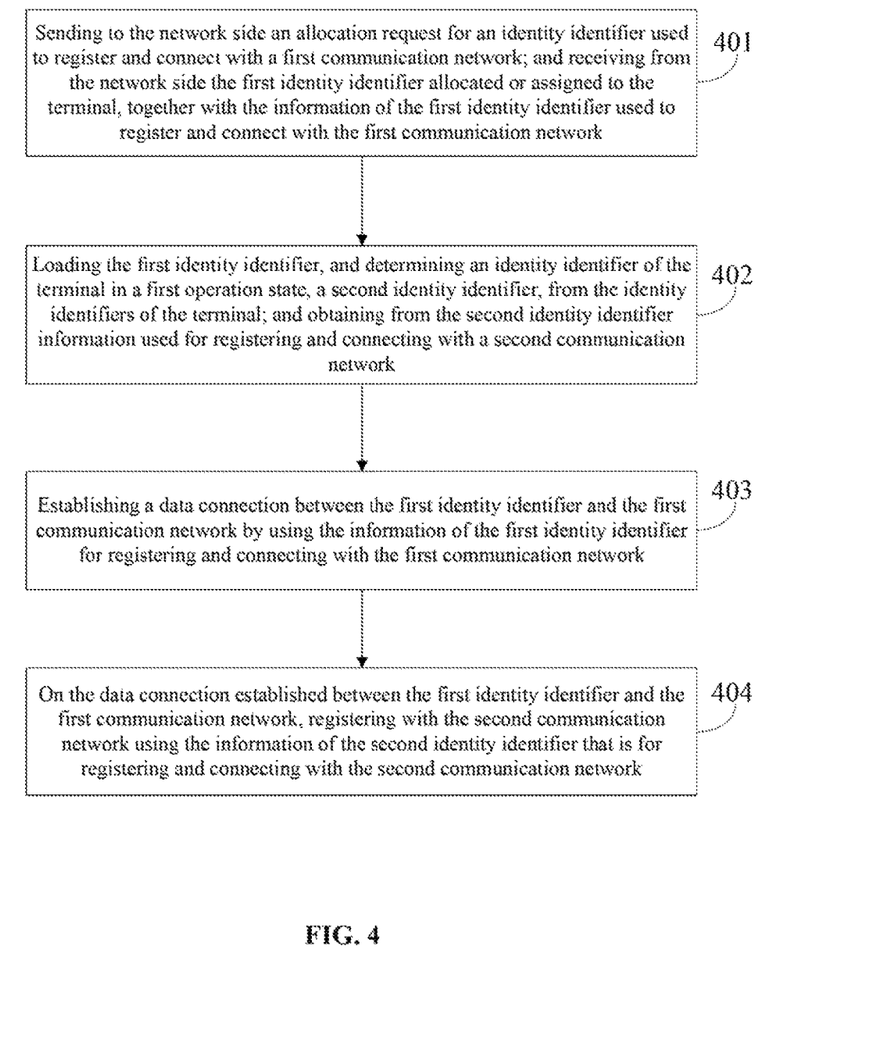
FIG. 4 illustrates a flow chart of another example of an information processing method consistent with the disclosed embodiments.

FIG. 4 illustrates a flowchart of another example of an information processing method according to the disclosed embodiments. The information processing method may be performed by the electronic device, which may also be referred as a terminal in a communication network when the electronic device communicates with the communication network, and the information processing method may include the following steps.

Step 401: Sending to the network side an allocation request for an identity identifier used to register and connect with a first communication network; and receiving from the network side the first identity identifier allocated or assigned to the terminal, together with the information of the first identity identifier used to register and connect with the first communication network.

In certain embodiments, the electronic device may include more than one communication modules. For example, the electronic device may include two communication modules, a first communication module and a second communication module. The first communication module may be realized by a first modem (modem1), and the second communication module may be realized by a second modem (modem2). The electronic device may also have a card slot in which a communication card can be inserted. As used herein, the communication card may be referred as a user identification module of the user, and the communication card may be a physical card of any appropriate type, such as a SIM card, a UIM card, or the like. The electronic devices may have two or more slots and, thus, two internal communication cards.

In certain embodiments, the network side stores card information of a plurality of virtual cards of the respective countries and regions, which include key information other than the Ki information. When the electronic device roams, the electronic device sends the network side an allocation request for an identity identifier (i.e., a virtual card). Upon receiving the allocation request, the network side searches for the card information of a virtual card (i.e., a first identity identifier) of the country or region where the electronic device is located, and then transmits the card information of the virtual card to the electronic device.

The first communication network refers to a 4G network, such as an LIE network. The first identity identifier assigned by the network side to the terminal refers to the virtual card assigned to the terminal by the network side. Correspondingly, the information of the first identity identifier for registering and connecting with the first communication network refers to the key information of the corresponding virtual card, such as the telephone number, the SMS text, the SIM card password, and the SIM card number, etc.

Step 402: Loading the first identity identifier, and determining an identity identifier of the terminal in a first operation state, a second identity identifier, from the identity identifiers of the terminal; and obtaining from the second identity identifier information used for registering and connecting with a second communication network.

Specifically, in certain embodiments, when the first identity identifier (i.e., the virtual card) is loaded, the identity identifier in the first operation state is determined as the second identity identifier, from the identity identifiers of the terminal, and the information used for registering and connecting with a second communication network is obtained from the second identity identifier.

As used herein, the identity identifier of the terminal refers to the physical card inserted in the card slot of the terminal, and the type of the physical card may be any appropriate type, such as a SIM card, a UIM card, or the like.

The physical card stores key information about the card, such as a phone number, SMS text, SIM password, SIM card number, and Ki information, etc. Such key information can be used to register with the network side. The disabled physical card also include the IP Multimedia Services Identity Module (ISIM) information, and the ISIM information is also read out and stored in the terminal.

In certain embodiments, the identity identifier in the first operation state is the physical card that is disabled when the first identity identifier is loaded.

Step 403: Establishing a data connection between the first identity identifier and the first communication network by using the information of the first identity identifier for registering and connecting with the first communication network.

The information of the first identity used for registering and connecting with the first communication network refers the key information of the virtual card, such as a telephone number, SMS text, a SIM card password, and a SIM card number, etc. The virtual card may use such key information to register with the 4G network, thus establishing the connection between the virtual card and the 4G network, and the data domain (PS domain) over this connection is the data connection between the virtual card and the 4G network.

Specifically, establishing the data, connection between the first identity identifier and the first communication network may refer to establishing a data connection between the virtual card and the data domain (PS domain). The virtual card may be used for data service and, to keep a high-grade service, the data service is required to register with an LTE network.

Accordingly, after the first identity identifier is connected to the communication module corresponding to the disabled physical card, the key information corresponding to the first identity identifier can be used to establish the data connection between first identity identifier and the first communication network.

Step 404: On the data connection established between the first identity identifier and the first communication network, registering with the second communication network using the information of the second identity identifier that is for registering and connecting with the second communication network.

Specifically, in certain embodiments, in the PS domain of the LTE network connected with the virtual card, the key information of the disabled physical card is used to register with the IP multimedia subsystem, thereby ensuring that the physical card can also be found through the volte. The terminal may use the ISIM information to perform the IMS registration.

Figure 5:
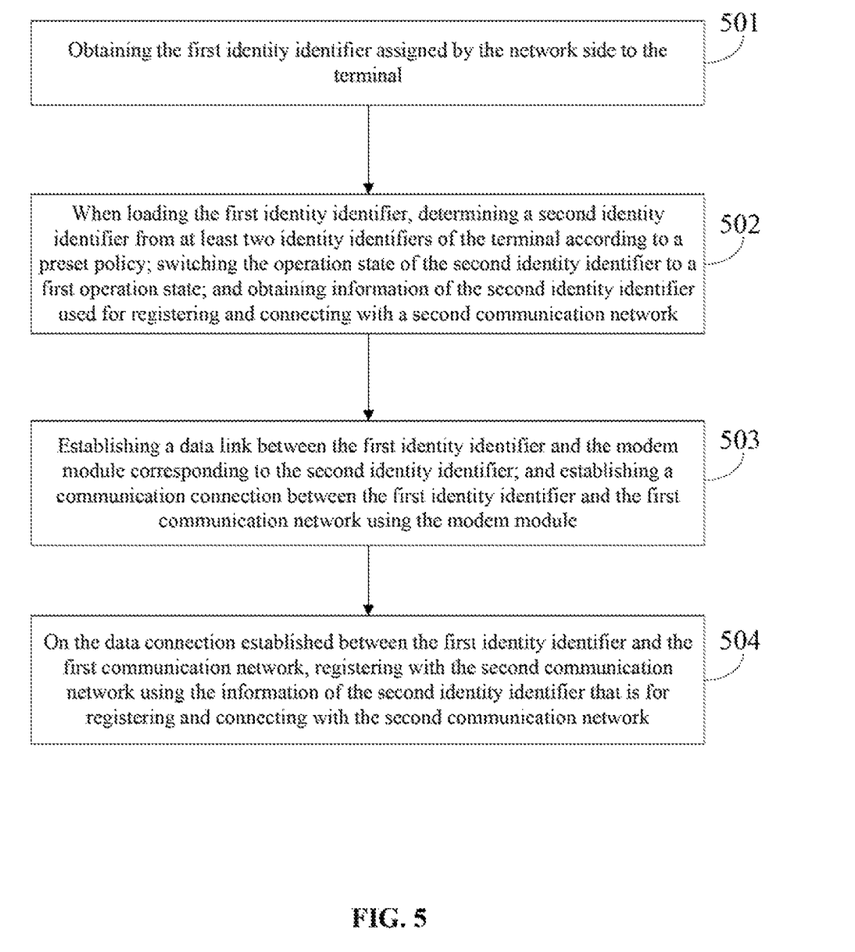
FIG. 5 illustrates a flow chart of another example of an information processing method consistent with the disclosed embodiments.

FIG. 5 illustrates a flowchart of another example of an information processing method according to the disclosed embodiments. The information processing method may be performed by the electronic device, which may also be referred as a terminal in a communication network when the electronic device communicates with the communication network, and the information processing method may include the following steps.

Step 501: Obtaining the first identity identifier assigned by the network side to the terminal.

In certain embodiments, the electronic device may include more than one communication modules. For example, the electronic device may include two communication modules, a first communication module and a second communication module. The first communication module may be realized by a first modem (modem1), and the second communication module may be realized by a second modem (modem2). The electronic device may also have a card slot in which a communication card can be inserted. As used herein, the communication card may be referred as a user identification module of the user, and the communication card may be a physical card of any appropriate type, such as a SIM card, a UIM card, or the like. The electronic devices may have two or more slots and, thus, two internal communication cards.

In certain embodiments, the network side stores card information of a plurality of virtual cards of the respective countries and regions, which include key information other than the Ki information. When the electronic device roams, the electronic device sends the network side an allocation request for an identity identifier (i.e., a virtual card). Upon receiving the allocation request, the network side searches for the card information of a virtual card (i.e., a first identity identifier) of the country or region where the electronic device is located, and then transmits the card information of the virtual card to the electronic device.

Step 502: When loading the first identity identifier, determining a second identity identifier from at least two identity identifiers of the terminal according to a preset policy; switching the operation state of the second identity identifier to a first operation state; and obtaining information of the second identity identifier used for registering and connecting with a second communication network.

When the second identity identifier is in a first operation state, the second identity identifier is disconnected from the modem module corresponding to the second identity identifier. That is, the second identity identifier is unloaded and is in a disabled state. At this time, the second identity identifier cannot continue nor al communication with the corresponding modem module.

Specifically, in certain embodiments, when the first identity identifier (i.e., the virtual card) is loaded, the identity identifier in the first operation state is determined as the second identity identifier, from the identity identifiers of the terminal, and the information used for registering and connecting with a second communication network is obtained from the second identity identifier.

As used herein, the identity identifier of the terminal refers to the physical card inserted in the card slot of the terminal, and the type of the physical card may be any appropriate type, such as a SIM card, a UIM card, or the like. The physical card stores key information about the card, such as a phone number, SMS text, SIM password, SIM card number, and Ki information, etc. Such key information can be used to register with the network side. The disabled physical card also include the IP Multimedia Services Identity Module (ISIM) information, and the ISIM information is also read out and stored in the terminal.

In certain embodiments, the identity identifier in the first operation state is the physical card that is disabled when the first identity identifier is loaded.

Step 503: Establishing a data link between the first identity identifier and the modem module corresponding to the second identity identifier; and establishing a communication connection between the first identity identifier and the first communication network using the modem module.

Establishing the data link between the first identity identifier and the modem module corresponding to the second identity identifier refers to: the modem module corresponding to the second identity identifier loads the key information of the first identity identifier, and then the modem module uses the key information in the first identity identifier to register with the first communication network so as to realize the connection between the first identity identifier and the first communication network.

In certain embodiments, establishing the data connection between the first identity identifier and the first communication network may refer to establishing a data connection between the virtual card and the data domain (PS domain). The virtual card may be used for data service and, to keep a high-grade service, the data service is required to register with an LIE network.

Accordingly, after the first identity identifier is connected to the communication module corresponding to the disabled physical card, the key information corresponding to the first identity identifier can be used to establish the data connection between first identity identifier and the first communication network.

Step 504: On the data connection established between the first identity identifier and the first communication network, registering with the second communication network using the information of the second identity identifier that is for registering and connecting with the second communication network.

Specifically, in certain embodiments, in the PS domain of the LTE network connected with the virtual card, the key information of the disabled physical card is used to register with the IP multimedia subsystem, thereby ensuring that the physical card can also be found through the volte. The terminal may use the ISIM information to perform the IMS registration.

Figure 6:
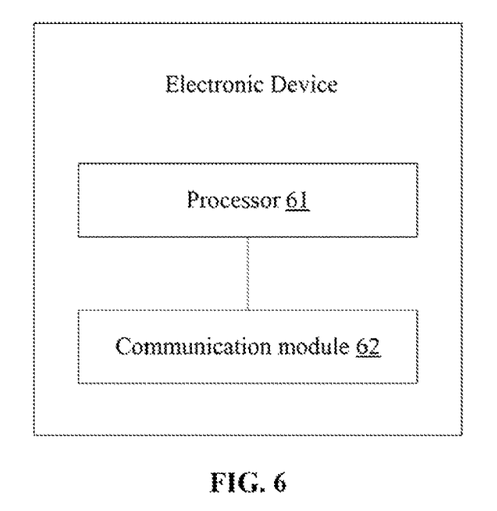
FIG. 6 illustrates a structural diagram of an example of an electronic device consistent with disclosed embodiments.

FIG. 6 illustrates an example of an electronic device consistent with the disclosed embodiments. As shown in FIG. 6, the electronic device includes at least a processor 61 and a communication module 62.

The processor 61 may include any appropriate type of graphic processing unit (GPU), general purpose microprocessor, digital signal processor (DSP) or microcontroller, and application specific integrated circuit (ASIC), etc., coupled with various memory modules, such as a random access memory (RAM) and a read-only memory (ROM), an input/output interface, a display unit, and a storage unit, etc. Processor 61 may execute sequences of computer program instructions to perform various information processing methods associated with the electronic device. The computer program instructions may be loaded into RAM for execution from ROM.

In operation, the processor 61 is provided for obtaining the first identity identifier assigned by the network side to the terminal; when loading the first identity identifier, determining a second identity identifier as an identity identifier of the terminal in a first operation state from the identity identifiers of the terminal; and obtaining from the second identity identifier information used for registering and connecting with a second communication network.

The communication module 62 is provided for establishing a data connection between the first identity identifier and the first communication network and, on the data connection established between the first identity identifier and the first communication network, registering with the second communication network using the information of the second identity identifier that is for registering the connection to the second communication network.

It should be understood by those skilled in the art that the implementation of the functions of the various units/modules in the electronic device shown in FIG. 6 can refer to the related description of the aforementioned information processing method. The functions of the units/modules in the electronic device shown in FIG. 6 may be realized by a program running on the processor or by specific hardware logic circuitry.

Figure 7:
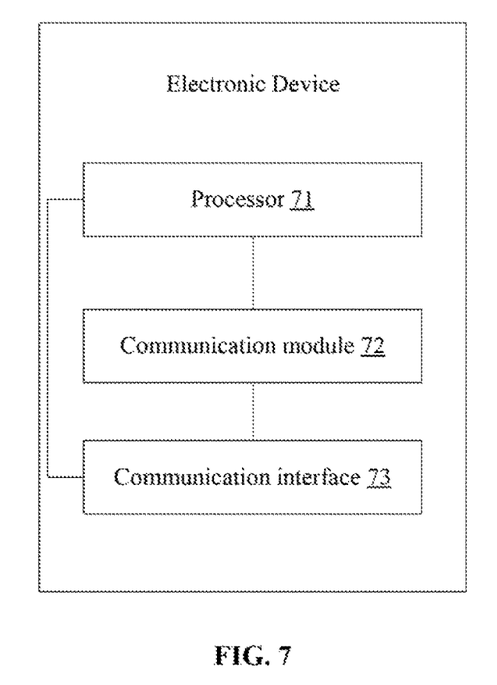
FIG. 7 illustrates a structural diagram of another example of an electronic device consistent with disclosed embodiments.

FIG. 7 illustrates another example of an electronic device consistent with the disclosed embodiments. As shown in FIG. 7, the electronic device includes a processor 71, a communication module 72, and a communication interface 73. Other modules may also be included.

The processor 71 is provided for obtaining the first identity identifier assigned by the network side to the terminal; when loading the first identity identifier, determining a second identity identifier as an identity identifier of the terminal in a first operation state from the identity identifiers of the terminal; and obtaining from the second identity identifier information used for registering and connecting with a second communication network.

The communication module 72 is provided for establishing a data connection between the first identity identifier and the first communication network and, on the data connection established between the first identity identifier and the first communication network, registering with the second communication network using the information of the second identity identifier that is for registering the connection to the second communication network.

The communication interface 73 is provided for transmitting to the network side an allocation request for an identity identifier used to register and connect with a first communication network; and receiving from the network side the first identity identifier allocated or assigned to the terminal, together with the information of the first identity identifier used to register and connect with the first communication network.

The communication module 72 further establishes a data connection between the first identity identifier and the first communication network by using the information of the first identity identifier for registering and connecting with the first communication network.

The processor 71 further determines a second identity identifier from at least two identity identifiers of the terminal in accordance with a preset policy when the first identity identifier is loaded; and switches the operation state of the second identity identifier to a first operation state. When the second identity identifier is in the first operation state, the second identity identifier is disconnected from the modem module corresponding to the second identity identifier.

The communication module 72 further establishes a data link between the first identity identifier and the modem module corresponding to the second identity identifier and to use the modem module to establish a connection between the first identity identifier and the first communication network.

It should be understood by those skilled in the art that the implementation of the functions of the various units/modules in the electronic device shown in FIG. 7 can refer to the related description of the aforementioned information processing method. The functions of the units/modules in the electronic device shown in FIG. 7 may be realized by a program running on the processor or by specific hardware logic circuitry.

Further, when no conflict exists, the various disclosed embodiments may be combined in any appropriate way.

It should also be understood that, in the various embodiments, the disclosed methods and devices may be implemented in other ways. The devices described above are merely illustrative. For example, the division of the units/modules is only one logical function division. In actual implementation, there may be an additional division ways.

For example, multiple units or components may be combined, or can be integrated into another system, or some features can be ignored, or not implemented. In addition, the coupling, direct coupling, or communication connection of the components shown or discussed with respect to each other may be indirect coupling or communication connection through some interface, device or unit, and may be electrical, mechanical, or other forms.

The elements described above as separate components may or may not be physically separated, and the elements displayed as units may or may not be physical units. That is, they may be located in one place or distributed over a plurality of network units; and some or all of the units may be selected according to actual needs.

Although the foregoing is detailed description of the present disclosure with reference to specific preferred embodiments, it should be understood that the present disclosure is not limited to the embodiments disclosed. For those skilled in the art to which the present disclosure belongs, various modifications and alterations can be made without departing from the spirit of the present invention, and shall all fall within the scope of the present disclosure.

What is claimed is:

1. An information processing method, comprising:
   obtaining a first identity identifier assigned to a terminal by a network side for establishing a data connection with a first communication network, including:
   sending to the network side an allocation request for an identity identifier to be used to register and connect with the first communication network; and
   receiving from the network side the first identity identifier assigned to the terminal, and information of the first identity identifier used to register and connect with the first communication network;
   in response to loading the first identity identifier, determining a second identity identifier, the second identity identifier being one of a plurality of identity identifiers of the terminal that is in a first operation state in which the second identity identifier is disassociated with a modem module corresponding to the second identity identifier, and determining the second identity identifier including:
   in response to loading the first identity identifier, determining the second identity identifier, from at least two identity identifiers of the terminal, according to a preset policy; and
   changing an operation state of the second identity identifier to the first operation state from a second operation state;
   obtaining, based on the second identity identifier, information used for registering and connecting with a second communication network;
   establishing the data connection between the first identity identifier and the first communication network using the information of the first identity identifier used to register and connect with the first communication network; and
   on the data connection established between the first identity identifier and the first communication network, registering with the second communication network using the information for registering and connecting with the second communication network.

2. The information processing method according to claim 1, wherein:
   the terminal is in a roaming state;
   the first identity identifier is a virtual card for roaming data service; and the second identity identifier is a physical card coupled to the terminal.

3. The information processing method according to claim 1, wherein establishing the data connection between the first identity identifier and the first communication network further includes:
establishing a data link between the first identity identifier and the modem module corresponding to the second identity identifier; and
establishing the data connection between the first identity identifier and the first communication network using the modem module corresponding to the second identity identifier.

4. An information processing method comprising:
obtaining a first identity identifier assigned to a terminal by a network side for establishing a data connection with a first communication network;
in response to loading the first identity identifier, determining a second identity identifier, the second identity identifier being one of a plurality of identity identifiers of the terminal that is in a first operation state;
obtaining, based on the second identity identifier, information used for registering and connecting with a second communication network;
establishing the data connection between the first identity identifier and the first communication network; and
on the data connection established between the first identity identifier and the first communication network, registering with the second communication network using the information for registering and connecting with the second communication network,
wherein:
the second identity identifier is changed from a second operation state to the first operation state after the first identity identifier is loaded on the terminal;
under the first operation state, the second identity identifier is disabled; and
under the second operation state, the second identity identifier is enabled.

5. The information processing method according to claim 4, wherein:
the information for registering and connecting with the second communication network of the second identity identifier includes IP Multimedia Services Identity Module (ISIM) information, and registering with the second communication network further includes:
reading and storing the ISIM information on the terminal; and
registering with an IP multimedia subsystem (IMS) of the second communication network using the ISIM information to enable the second identity identifier, while disabled, to be discoverable via Voice over Long-Term Evolution (VoLTE) communication.

6. An electronic device, comprising:
a processor supported by the device, wherein the processor:
obtains a first identity identifier assigned to a terminal by a network side for establishing a data connection with a first communication network, including:
sending to the network side an allocation request for an identity identifier to be used to register and connect with the first communication network; and
receiving from the network side the first identity identifier assigned to the terminal, and information of the first identity identifier used to register and connect with the first communication network;
in response to loading the first identity identifier on the terminal, determines a second identity identifier, the second identity identifier being one of a plurality of identity identifiers of the terminal that is in a first operation state in which the second identity identifier is disassociated with a modem module corresponding to the second identity identifier, and determining the second identifier including:
in response to loading the first identity identifier, determining the second identity identifier, from at least two identity identifiers of the terminal, according to a preset policy; and
changing an operation state of the second identity identifier to the first operation state; and
obtains, based on the second identity identifier, information used for registering and connecting with a second communication network; and
a communication module communicating with the processor, wherein the communication module:
establishes the data connection between the first identity identifier and the first communication network using the information of the first identity identifier used to register and connect with the first communication network; and
on the data connection established between the first identity identifier and the first communication network, registers with the second communication network using the information for registering and connecting with the second communication network.

7. The electronic device according to claim 6, wherein, to establish the data connection between the first identity identifier and the first communication network, the communication module further establishes a data link between the first identity identifier and the modem module corresponding to the second identity identifier; and establishes the data connection between the first identity identifier and the first communication network using the modem module corresponding to the second identity identifier.

8. The electronic device according to claim 6, wherein:
the terminal is in a roaming state;
the first identity identifier is a virtual card for roaming data service; and
the second identity identifier is a physical card coupled to the terminal.

9. The information processing method according to claim 4, wherein:
the terminal is in a roaming state;
the first identity identifier is a virtual card for roaming data service; and
the second identity identifier is a physical card coupled to the terminal.

10. An electronic device comprising:
a processor supported by the device, wherein the processor:
obtains a first identity identifier assigned to a terminal by a network side for establishing a data connection with a first communication network;
in response to loading the first identity identifier on the terminal, determines a second identity identifier, the second identity identifier being one of a plurality of identity identifiers of the terminal that is in a first operation state; and
obtains, based on the second identity identifier, information used for registering and connecting with a second communication network; and
a communication module communicating with the processor, wherein the communication module:

establishes the data connection between the first identity identifier and the first communication network; and on the data connection established between the first identity identifier and the first communication network, registers with the second communication network using the information for registering and connecting with the second communication network, wherein:

the second identity identifier is changed from a second operation state to the first operation state after the first identity identifier is loaded on the terminal;

under the first operation state, the second identity identifier is disabled; and under the second operation state, the second identity identifier is enabled.

11. The electronic device according to claim 10, wherein:
the information for registering and connecting with the second communication network of the second identity identifier includes IP Multimedia Services Identity Module (ISIM) information, and to register with the second communication network, the communication module further reads and stores the ISIM information on the terminal; and registers with an IP multimedia subsystem (IMS) of the second communication network using the ISIM information to enable the second identity identifier, while disabled, to be discoverable via Voice over Long-Term Evolution (VoLTE) communication.

12. The electronic device according to claim 10, wherein:

the terminal is in a roaming state;

the first identity identifier is a virtual card for roaming data service; and the second identity identifier is a physical card coupled to the terminal.

\* \* \* \* \*